US012771498B2

(12) United States Patent
Zhang et al.

(10) Patent No.: US 12,771,498 B2
(45) Date of Patent: Oct. 20, 2026

(54) METHOD AND DEVICE FOR TRANSMITTING AND RECEIVING DATA, TRANSMITTING DEVICE, RECEIVING DEVICE, AND MEDIUM

(71) Applicant: ZTE CORPORATION, Guangdong (CN)

(72) Inventors: Weiliang Zhang, Guangdong (CN); Liquan Yuan, Guangdong (CN)

(73) Assignee: ZTE Corporation, Guangdong (CN)

( * ) Notice: Subject to any disclaimer, the term of this patent is extended or adjusted under 35 U.S.C. 154(b) by 707 days.

(21) Appl. No.: 18/021,236

(22) PCT Filed: Aug. 12, 2021

(86) PCT No.: PCT/CN2021/112326

§ 371 (c)(1),
(2) Date: Feb. 14, 2023

(87) PCT Pub. No.: WO2022/033559

PCT Pub. Date: Feb. 17, 2022

(65) Prior Publication Data

US 2023/0308232 A1 Sep. 28, 2023

(30) Foreign Application Priority Data

Aug. 14, 2020 (CN) ......................... 202010820994.7

(51) Int. Cl.
*H04L 5/00* (2006.01)

(52) U.S. Cl.
CPC .......... *H04L 5/0046* (2013.01); *H04L 5/0032* (2013.01)

(58) Field of Classification Search
USPC ........................................................ 370/392
See application file for complete search history.

(56) References Cited

U.S. PATENT DOCUMENTS 6,560,231 B1 * 5/2003 Kawakami .......... H04L 12/5601 370/395.43
7,593,418 B1 * 9/2009 Benhaim ............ H04Q 11/0067 370/432
9,673,855 B2 * 6/2017 Branlund .......... H04W 72/0453
(Continued)

FOREIGN PATENT DOCUMENTS

CN 101729940 A 6/2010
CN 101815229 A 8/2010
(Continued)

OTHER PUBLICATIONS

International Search Report mailed Nov. 11, 2021 for Application No. PCT/CN2021/112326 (four (4) pages).
(Continued)

*Primary Examiner* — Christopher T Wyllie
(74) *Attorney, Agent, or Firm* — KDW Firm PLLC

(57) ABSTRACT

Provided are a data sending method and apparatus, a data receiving method and apparatus, a sending device, a receiving device and a medium. In the data sending method, to-be-transmitted data is generated into a data frame according to a bandwidth on each channel; the data frame is divided into at least two data units; and the at least two data units are sent one by one through at least two channels according to a predetermined principle.

20 Claims, 8 Drawing Sheets

(56) References Cited

U.S. PATENT DOCUMENTS

| | | | | |
|---|---|---|---|---|
| 2005/0015493 | A1* | 1/2005 | Anschutz | H04L 47/2408 709/226 |
| 2015/0117455 | A1* | 4/2015 | Umesh | H04L 45/38 370/392 |
| 2015/0281125 | A1* | 10/2015 | Koponen | G06F 12/0811 711/122 |
| 2015/0373430 | A1* | 12/2015 | Kim | H04Q 11/0067 398/48 |
| 2016/0286290 | A1 | 9/2016 | Zheng et al. | |
| 2017/0012731 | A1* | 1/2017 | Luo | H04J 14/0227 |
| 2017/0155983 | A1 | 6/2017 | Detwiler | |
| 2018/0077475 | A1 | 3/2018 | Ye et al. | |
| 2018/0097686 | A1* | 4/2018 | Franke | H04L 69/06 |
| 2018/0227236 | A1* | 8/2018 | Shen | H04L 45/64 |
| 2018/0309518 | A1* | 10/2018 | Gao | H04B 10/272 |
| 2021/0329356 | A1* | 10/2021 | Khotimsky | H04Q 11/0067 |
| 2022/0086544 | A1* | 3/2022 | Zhang | H04Q 11/0067 |
| 2023/0025057 | A1* | 1/2023 | Sun | H04B 17/336 |
| 2023/0116565 | A1* | 4/2023 | Wang | H04W 72/0457 370/329 |
| 2023/0130286 | A1* | 4/2023 | Leng | H04W 36/0058 370/331 |
| 2023/0308232 | A1* | 9/2023 | Zhang | H04L 5/0032 |
| 2024/0422674 | A1* | 12/2024 | Ryu | H04W 40/244 |
| 2025/0031193 | A1* | 1/2025 | Wang | H04L 5/0092 |

FOREIGN PATENT DOCUMENTS

| | | | | |
|---|---|---|---|---|
| CN | 103281218 | | * | 9/2013 |
| CN | 103281218 | A | * | 9/2013 |
| CN | 107735988 | A | | 2/2018 |
| CN | 108540221 | A | | 9/2018 |
| CN | 109756796 | A | | 5/2019 |

OTHER PUBLICATIONS

Extended European Search Report issued in EP Application No. 21855609.0, dated Sep. 27, 2024, 10 pages.

* cited by examiner

METHOD AND DEVICE FOR TRANSMITTING AND RECEIVING DATA, TRANSMITTING DEVICE, RECEIVING DEVICE, AND MEDIUM

CROSS-REFERENCE TO RELATED APPLICATIONS

This is a National Stage Application filed under 35 U.S.C. 371 based on International Patent Application No. PCT/CN2021/112326, filed on Aug. 12, 2021, which claims priority to Chinese Patent Application 202010820994.7 filed on Aug. 14, 2020, disclosures of both of which are incorporated herein by reference in their entireties.

TECHNICAL FIELD

The present application relates to an optical network, for example, to a data sending method and apparatus, a data receiving method and apparatus, a sending device, a receiving device and a medium.

BACKGROUND

In the Next Generation Ethernet Passive Optical Network (NG EPON) standard, in a case where to-be-transmitted data is distributed over multiple channels for transmission, to clarify the data distribution and transmission condition on each channel, to-be-transmitted data on each channel needs to be separately encapsulated, and a frame header needs to be added to each encapsulation to indicate the distribution and transmission of data on each channel. However, adding a frame header will bring additional overhead and affect the transmission efficiency of data; especially in a case of short to-be-transmitted data or binding of multiple channels, the transmission efficiency is relatively low. For example, in a case where the length of the to-be-transmitted data is 64 bytes, if the transmission is performed on a single channel, a frame header of 8 bytes is added, and the data transmission efficiency is 88.89%; if the transmission is performed on two channels, frame headers need to be added to the two channels, respectively, and the data transmission efficiency is 80%; if the transmission is performed on four channels, frame headers need to be added to the four channels, respectively, and the data transmission efficiency is only 66.67%.

SUMMARY

An embodiment of the present application provides a data sending method. The method includes the following.

To-be-transmitted data is generated into a data frame according to a bandwidth on each channel.

The data frame is divided into at least two data units.

The at least two data units are sent one by one through at least two channels according to a predetermined principle.

An embodiment of the present application further provides a data receiving method. The method includes the following.

Data units are received, according to a bandwidth on each channel, one by one through at least two channels according to a predetermined principle.

The data units are formed into a data frame according to a receiving order.

An embodiment of the present application further provides a data sending apparatus. The data sending apparatus includes a frame generation module, a division module and a sending module.

The frame generation module is configured to generate to-be-transmitted data into a data frame according to a bandwidth on each channel.

The division module is configured to divide the data frame into at least two data units.

The sending module is configured to send the at least two data units one by one through at least two channels according to a predetermined principle.

An embodiment of the present application further provides a data receiving apparatus. The data receiving apparatus includes a receiving module and a processing module.

The receiving module is configured to receive, according to a bandwidth on each channel, data units one by one through at least two channels according to a predetermined principle.

The processing module is configured to form the data units into a data frame according to a receiving order.

An embodiment of the present application further provides a sending device. The sending device includes one or more processors and a storage apparatus configured to store one or more programs.

The one or more programs, when executed by the one or more processors, cause the one or more processors to implement the preceding data sending method.

An embodiment of the present application further provides a receiving device. The receiving device includes one or more processors and a storage apparatus configured to store one or more programs.

The one or more programs, when executed by the one or more processors, cause the one or more processors to implement the preceding data receiving method.

An embodiment of the present application further provides a non-transitory computer-readable storage medium for storing a computer program which, when executed by a processor, implements the preceding data sending method or the preceding data receiving method.

DETAILED DESCRIPTION

Figure 1:
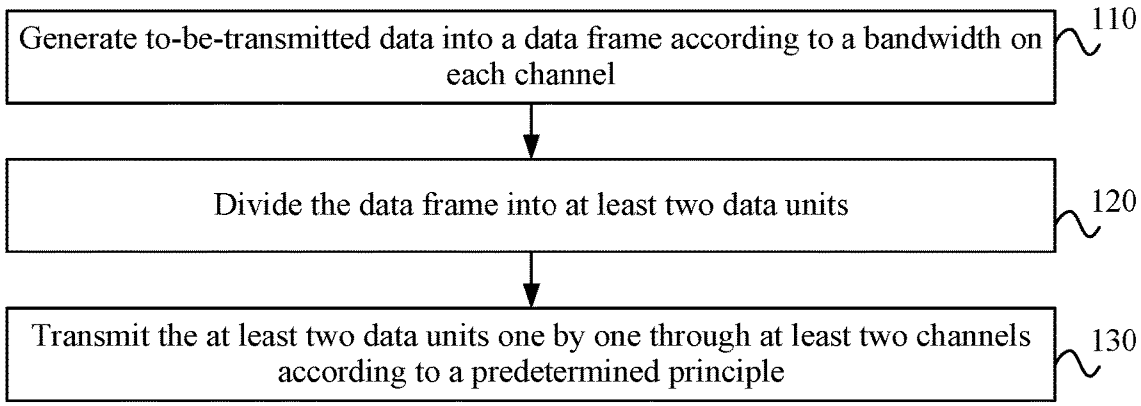
FIG. 1 is a flowchart of a data sending method according to an embodiment.

The present application is described hereinafter in conjunction with drawings and embodiments. It is to be understood that specific embodiments described herein are intended to explain the present application and not to limit the present application. It is to be noted that if not in collision, the embodiments of the present application and features therein may be combined with each other in any manner. Additionally, it is to be noted that for ease of description, only part, not all, of structures related to the present application are illustrated in the drawings.

An embodiment of the present application provides a data sending method. The method is applicable to a sending device in a passive optical network (PON), and the sending device may be, for example, an optical line terminal (OLT) or an optical network unit (ONU). The PON is a point-to-multipoint network architecture, and the PON may include one OLT and at least one ONU.

FIG. 1 is a flowchart of a data sending method according to an embodiment. As shown in FIG. 1, the method provided in the embodiment includes 110 to 130 described below.

In 110, to-be-transmitted data is generated into a data frame according to a bandwidth on each channel.

In the embodiment, in the case of binding of multiple channels, the to-be-transmitted data is encapsulated into a data frame in a single channel manner. For example, the to-be-transmitted data is formed into a data frame in a standard format according to the bandwidth and slot available to the sending device.

In 120, the data frame is divided into at least two data units.

In the embodiment, in the process of transmitting the data frame, the data frame is divided into several data units.

In 130, the at least two data units are transmitted one by one through at least two channels according to a predetermined principle.

In the embodiment, the data units are sequentially allocated to different channels according to the predetermined principle and sent one by one until the sending of the data frame is completed. In this case, in combination with the bandwidth of each channel and the predetermined principle, the sending condition of each data unit on each channel can be determined, and no additional frame header processing needs to be performed on each channel, so that the frame header overhead is reduced and the data transmission efficiency is improved.

In the embodiment, the predetermined principle is used for describing through which channel data units should be sequentially sent, and the predetermined principle may be determined according to the bandwidth and slot available to each channel, the serial number of each channel, the priority of each channel, the data transmission quality of each channel, etc. For example, the predetermined principle may be an earliest-and-minimum principle; that is, each data unit is sent through a channel having the earliest sending time of the at least two channels, and if multiple channels having the earliest sending time exist, in some examples, a channel having the minimum channel serial number may be selected from the multiple channels for sending. For another example, the predetermined principle may be an earliest-and-highest-priority principle; that is, each data unit is sent through a channel having the earliest sending time of the at least two channels, and if multiple channels having the earliest sending time exist, in some examples, a channel having the highest priority may be selected from the multiple channels for sending. The priority of each channel may be predefined, stored locally, indicated by signaling, or determined according to the data transmission quality.

In the embodiment, a data unit may also be understood as a transmission unit (TU) of data. For example, every 8 bytes compose a data unit, or every 4 bytes compose a data unit.

According to the data sending method of the embodiment, the sending device encapsulates the to-be-transmitted data into the data frame, then divides the data frame into multiple data units, and sends the data units one by one through different channels according to the predetermined principle. In this process, the transmission condition of the data on each channel can be clarified according to the bandwidth and the predetermined principle without additional frame header processing on each channel, so that the frame header overhead is reduced and the data transmission efficiency is improved.

In an embodiment, 130 includes the following.

Each data unit is sent through a channel having the earliest sending time; and in a case where at least two channels having the earliest sending time exist, one channel is selected from the at least two channels having the earliest sending time according to a minimum channel serial number or a maximum channel serial number, and the each data unit is sent through the one channel.

In this embodiment, the predetermined principle includes an earliest-minimum principle or an earliest-maximum principle; that is, each data unit is sent through a channel having the earliest sending time of the channels, and if multiple channels having the earliest sending time exist, in some examples, a channel having the minimum channel serial number or a channel having the maximum channel serial number may be selected from the multiple channels for sending the data unit.

In an embodiment, 101 is further included.

In 101, in a case of an upstream direction, upstream bandwidth allocation of each channel is determined according to bandwidth allocation information carried in a downstream frame.

In this embodiment, the OLT allocates an upstream bandwidth to each ONU, and sends an upstream bandwidth allocation result to each ONU through a downstream frame; if the upstream bandwidth allocation does not change, the OLT may continue to send the upstream bandwidth allocation through the downstream frame, or may wait until the upstream bandwidth allocation is updated and then send the updated upstream bandwidth allocation.

In this embodiment, in the case of the upstream direction, the sending device is the ONU, and the receiving device is the OLT. Before data transmission is performed, the OLT may send a downstream frame to the ONU. The downstream frame carries bandwidth allocation information of each ONU, and the ONU can determine, according to the bandwidth allocation information, the bandwidth allocation of the ONU itself for sending upstream data on each channel, that is, determine the bandwidth of the ONU on each channel.

The upstream sending of the ONU is controlled by the OLT. The OLT sends upstream bandwidth allocation information to each ONU according to a request of the ONU or according to traffic statistics for the ONU by the OLT; for example, the OLT may allocate an upstream bandwidth to each ONU through a bandwidth map; the ONU parses the bandwidth map to obtain a bandwidth entry belonging to the ONU itself; and the ONU sends upstream data and management information to the OLT within the bandwidth specified in the corresponding bandwidth entry. The ONU calculates the sum of upstream bandwidths on the channels according to the bandwidth corresponding to the ONU, and in some examples, may also calculate the sum of bandwidths of transmission containers (T-CONTs) on the channels, thereby encapsulating the to-be-transmitted data into the data frame. It is to be noted that the bandwidth map may not be sent in each downstream frame. The ONU may locally save the bandwidth corresponding to the ONU, and in the case of not receiving the bandwidth map, sends upstream data and management information according to the locally stored bandwidth. In addition, for certain determined bandwidths, such as a fixed-size bandwidth including an 10-Gigabit-capable passive optical network (XG-PON) transmission convergence (XGTC) frame header and an XGTC frame tail, or a bandwidth that can be calculated and includes a forward error correction (FEC) check, although the OLT has allocated these bandwidths to the ONU, the allocation information of these bandwidth may not be sent to the ONU; the ONU can still utilize these bandwidths.

In an embodiment, the data frame includes, but is not limited to, a transmission convergence (TC) data frame, or a dynamic bandwidth report upstream (DBRu) and a gigabit encapsulation method (GEM) frame sequence, or a GEM frame sequence.

In the embodiment, in the case of the upstream direction, the sending device is the ONU, and the receiving device is the OLT. The to-be-transmitted data may be encapsulated into a TC data frame, or a DBRu and a GEM frame sequence, or a GEM frame sequence.

Figure 2:
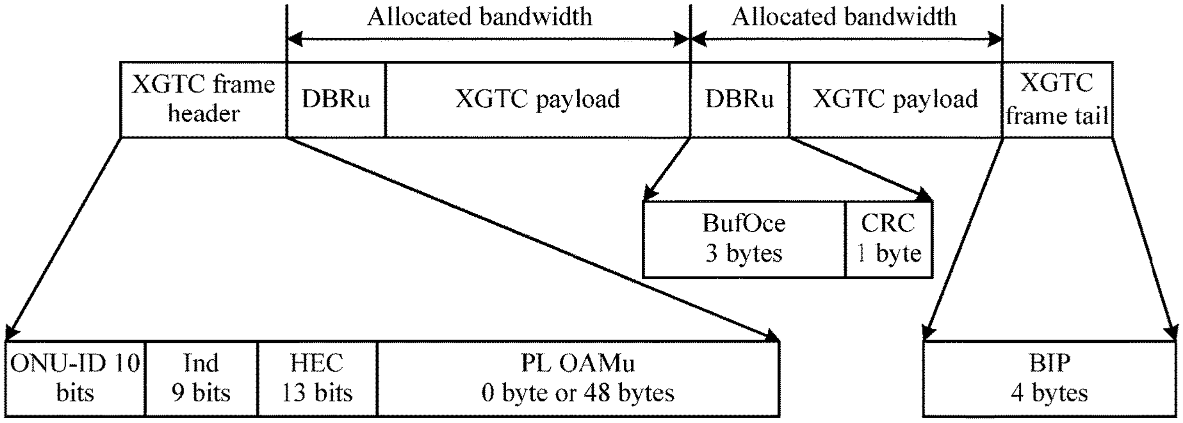
FIG. 2 is a schematic diagram of an upstream XGTC frame according to an embodiment.

FIG. 2 is a schematic diagram of an upstream XGTC frame according to an embodiment. The upstream XGTC frame is an example of an upstream TC data frame. In the embodiment, the to-be-transmitted data is encapsulated into a TC data frame, and the generation of an XG-PON transmission convergence (XGTC) data frame is taken as an example. As shown in FIG. 2, on the bandwidth corresponding to the ONU, the to-be-transmitted data is encapsulated as payloads, and composes an XGTC frame together with the DBRu, an XGTC frame header and an XGTC frame tail. The XGTC frame header includes an ONU identifier (ONU-ID), a frame indication (Ind), a hybrid error correction (HEC) code and a Physical Layer Operation, Administration, and Maintenance upstream (PLOAMu); the DBRu contains buffer occupancy (BufOcc) and a cyclic redundancy check (CRC) code, and the XGTC frame tail includes a bit-interleaved parity (BIP).

In an embodiment, 120 includes the following. A physical synchronization block (PSB) is added to each channel, and a forward error correction (FEC) code is added to each FEC data block.

Figure 3:
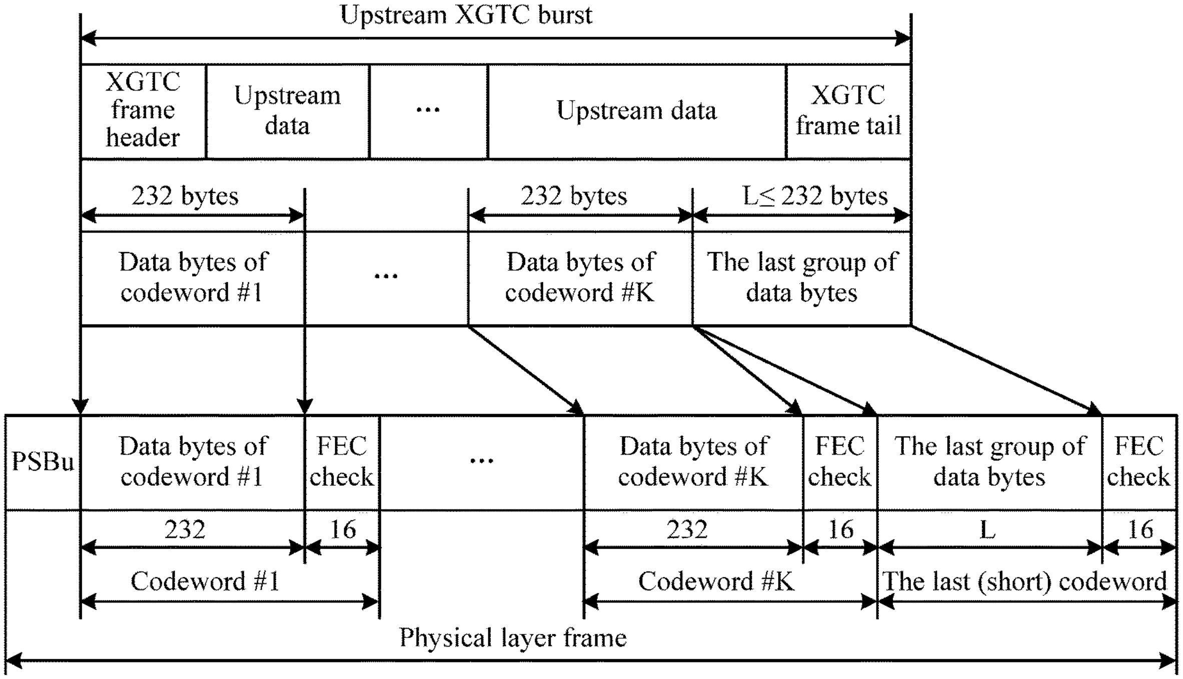
FIG. 3 is a diagram showing the conversion of an XGTC frame to a physical layer frame according to an embodiment.

FIG. 3 is a diagram showing the conversion of an XGTC frame to a physical layer frame according to an embodiment. As shown in FIG. 3, an upstream XG-PON transmission convergence (XGTC) burst sent by the ONU includes an XGTC frame header, an XGTC frame tail and upstream data in the middle part, which compose an upstream XGTC frame. The upstream XGTC frame is divided into multiple FEC data blocks. For example, starting from the XGTC frame header, every 232 bytes of data are divided into one group, codewords corresponding to groups include #1, #2, . . . , and #K, and the number of bytes of data contained in the last group is less than or equal to 232; The FEC check is added to each group of data separately to form an FEC codeword, where the FEC check may be the 16-byte parity so that the division of FEC data blocks is achieved; a physical synchronization block upstream (PSBu) is added to the frontmost of the XGTC frame so that an upstream physical burst can be formed.

In the embodiment, after the data units obtained through division on the data frame are distributed to the channels, an XGTC subframe is formed on each channel, and a PSBu and an FEC check may be added to the XGTC subframe in the manner in FIG. 3.

In the embodiment, in the case of the upstream direction, the data frame is an XGTC frame, and the data frame is divided into at least two data units.

Figure 4:
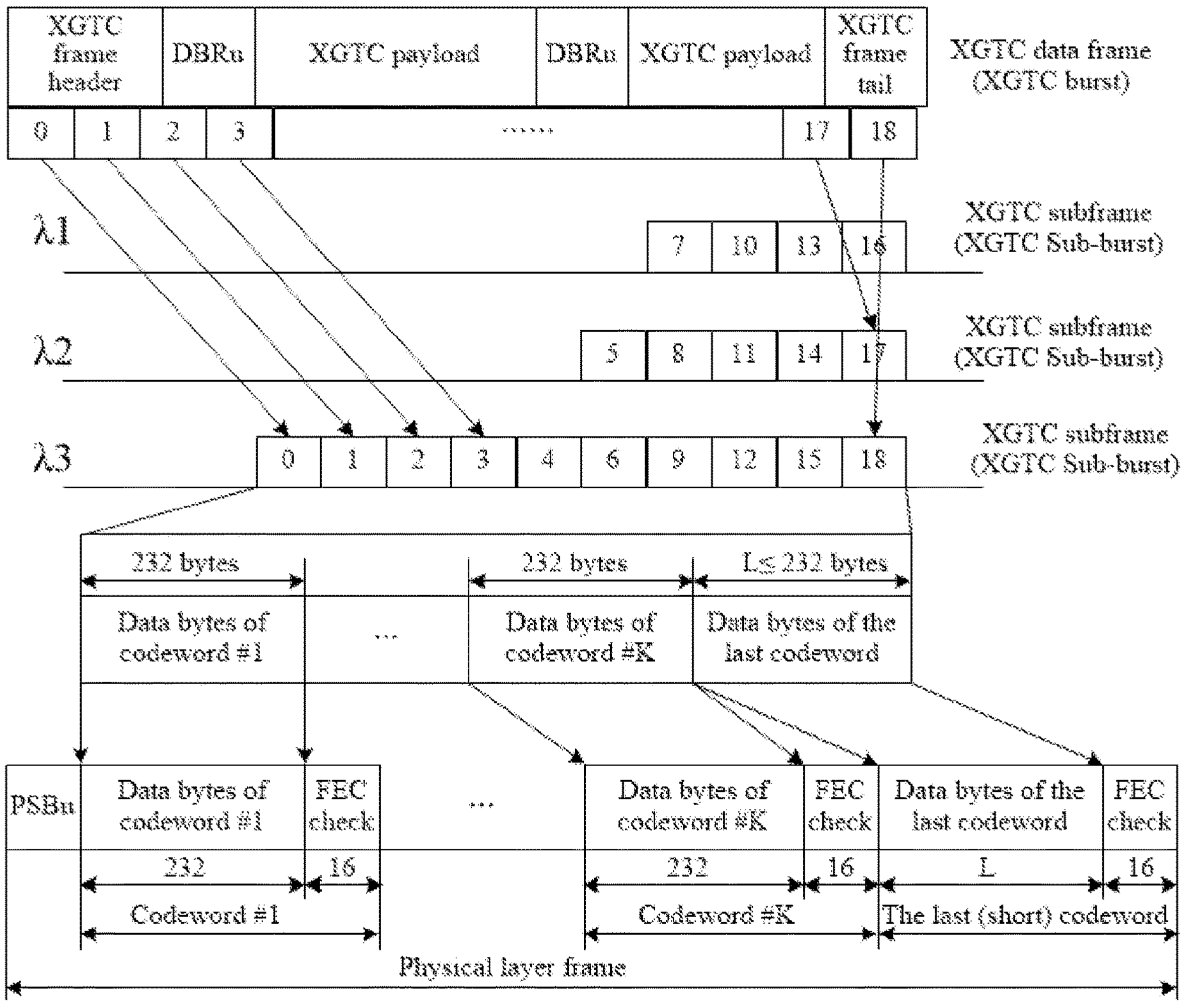
FIG. 4 is a diagram of sending a data frame in an upstream direction according to an embodiment.

FIG. 4 is a diagram of sending a data frame in an upstream direction according to an embodiment. As shown in FIG. 4, an upstream XGTC frame (an upstream XGTC burst) is divided into 19 data units from the XGTC frame header to the XGTC frame tail, and serial numbers of the 19 data units are 0 to 18, respectively. 3 channels exist, and serial numbers of the 3 channels are 1, 2 and 3, respectively; according to the upstream bandwidth allocation, channel 3 is the channel having the earliest sending time. Data units 0 to 4 are all sent through channel 3; when data unit 5 is sent, channel 2 and channel 3 both are channels having the earliest sending time at this moment, and in this case, the channel having the minimum channel serial number may be selected; that is, data unit 5 is sent through channel 2, and only channel 3 is the channel having the earliest sending time for sending data unit 6. Similarly, when data unit 7 is sent, channel 1, channel 2 and channel 3 all are channels having the earliest sending time at this moment, and in this case, channel 1 may be selected to send data unit 7, channel 2 is selected to send data unit 8, and then only channel 3 is the channel having the earliest sending time for sending data unit 9. The similar operation is continued until the sending of data unit 18 is completed. The data unit sequence on each channel is used as the XGTC subframe, and a PSBu and an FEC check are added to the XGTC subframe on each channel in the manner in FIG. 3. FIG. 4 shows an example of processing channel 3; channel 1 and channel 2 are processed similarly but are not shown in FIG. 4. In addition, the OLT allocates a bandwidth to the ONU on each channel, and only one XGTC frame header and one XGTC frame trail can be sent within the bandwidth.

In an embodiment, the OLT (the OLT is the receiving device in the case of the upstream direction and is the sending device in the case of the downstream direction) also notifies the ONU (the ONU is the sending device in the case of the upstream direction and is the receiving device in the case of the downstream direction) of the size of the bandwidth occupied by each T-CONT through downstream bandwidth allocation information, and the ONU determines the bandwidth occupied by each T-CONT according to the notification. The bandwidth occupied by each T-CONT is used for sending the DBRu and/or data of the T-CONT, and the data is encapsulated into a GEM frame sequence to form an XGTC payload.

In another embodiment, in the case of the upstream direction, the data frame is a DBRu and an XGTC payload. The XGTC payload is generally a GEM frame sequence, and the data frame is divided into at least two data units. The data frame may be composed of a DBRu and a GEM frame sequence of one T-CONT or DBRus and GEM frames of multiple T-CONTs.

Figure 5:
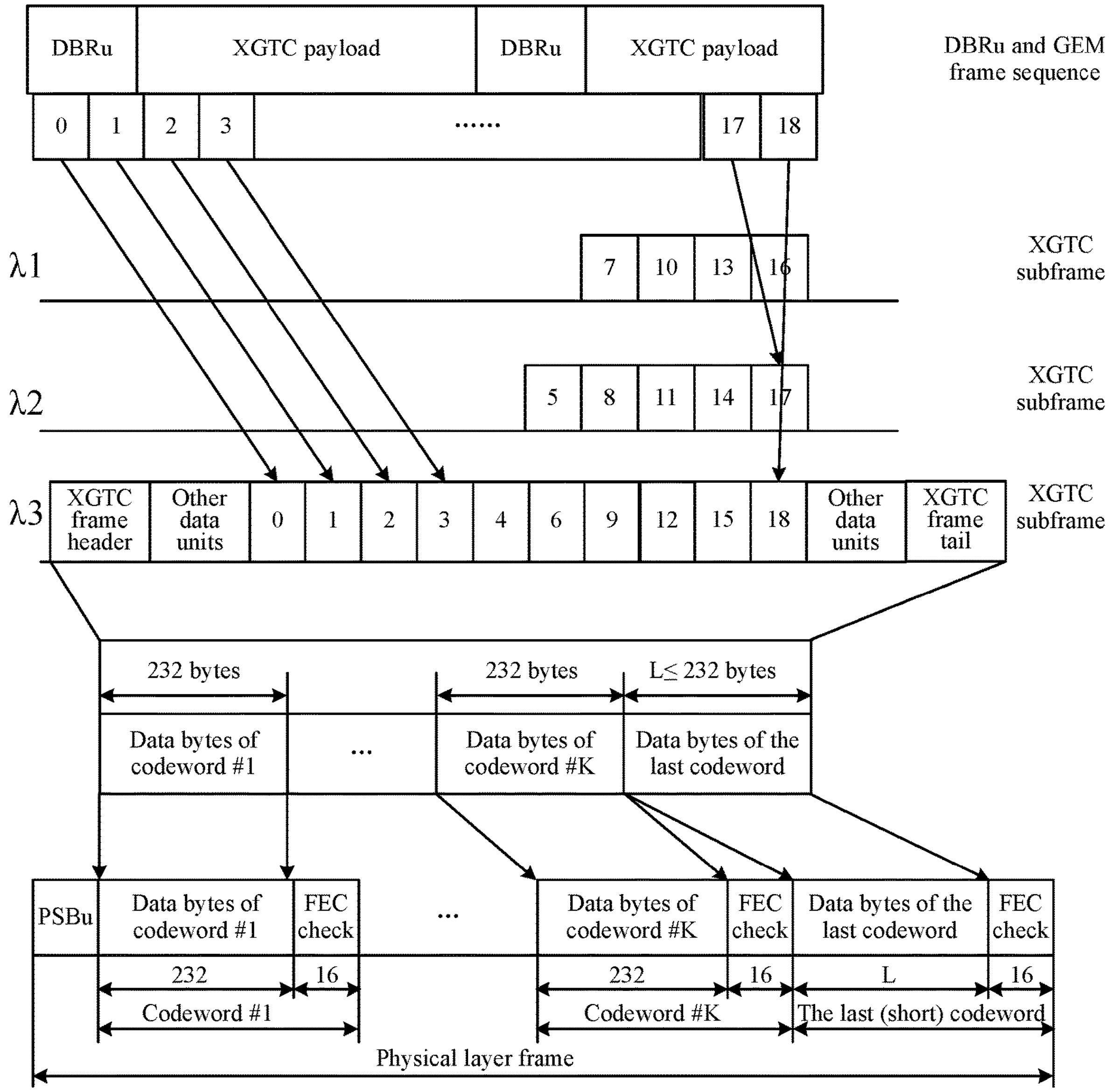
FIG. 5 is a diagram of sending a data frame in an upstream direction according to another embodiment.

FIG. 5 is a diagram of sending a data frame in an upstream direction according to another embodiment. In the embodiment, the data frame includes DBRus and GEM frame sequences, an XGTC frame header and an XGTC frame tail are sent on each channel, and the specific content thereof is determined according to the specific condition of each channel. As shown in FIG. 5, the data frame includes 19 data units obtained through division from the first DBRu to the last XGTC payload, and serial numbers are 0 to 18, respectively; 3 channels totally exist, and channel serial numbers are 1, 2 and 3, respectively, where channel 3 is the channel having the earliest sending time. The 19 data units are sent one by one on the 3 channels according to the earliest-and-minimum principle; an XGTC frame header is sent before the data unit is sent on each channel, and an XGTC frame tail is sent after the sending of the data unit is completed. The XGTC frame header, the data unit sequence and the XGTC frame tail on each channel form an XGTC subframe, and on each channel, a PSBu and an FEC check are added to the XGTC subframe on each channel in the manner in FIG. 3. FIG. 5 shows an example of processing channel 3; channel 1 and channel 2 are processed similarly but are not shown in FIG. 5. In addition, in the embodiment, the OLT allocates a bandwidth to the ONU on each channel, and the bandwidth supports sending an XGTC frame header and an XGTC frame tail separately on each channel. In addition, the OLT also notifies the ONU of the size of the bandwidth occupied by each T-CONT, the bandwidth occupied by each T-CONT is used for sending the DBRu and/or data of the T-CONT, and the data is encapsulated into a GEM frame sequence to form an XGTC payload. The data frame in FIG. 5 is composed of DBRus and GEM frame sequences of multiple T-CONTs. It is to be noted that the case where the data frame is composed of a DBRu and a GEM frame sequence of one T-CONT is also applicable to the embodiment.

In another embodiment, in the case of the upstream direction, the data frame is a GEM frame sequence, and the data frame is divided into at least two data units. The data frame may be composed of a GEM frame sequence of one T-CONT or GEM frames of multiple T-CONTs.

Figure 6:
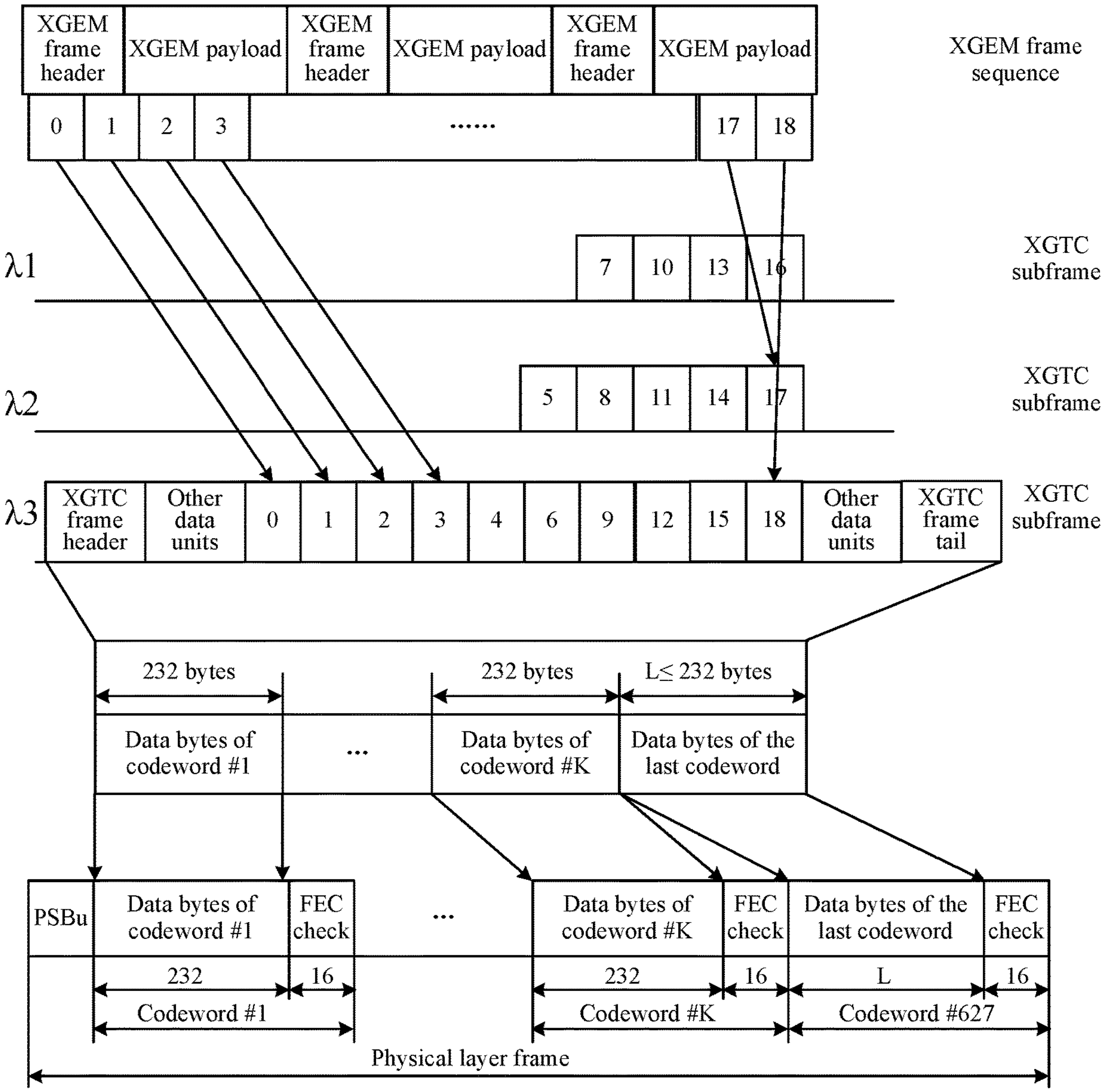
FIG. 6 is a diagram of sending a data frame in an upstream direction according to another embodiment.

FIG. 6 is a diagram of sending a data frame in an upstream direction according to another embodiment. As shown in FIG. 6, according to the bandwidth allocation, the to-be-sent data is encapsulated into an XG-PON Encapsulation Method (XGEM) frame sequence as the data frame. The data frame is divided into 19 data units, and serial numbers are 0 to 18, respectively; 3 channels totally exist, and channel serial numbers are 1, 2 and 3, respectively, where channel 3 is the channel having the earliest sending time. Data units 0 to 4 are all sent through channel 3; when data unit 5 is sent, channel 2 and channel 3 both are channels having the earliest sending time at this moment, and in this case, the channel having the minimum channel serial number may be selected; that is, data unit 5 is sent through channel 2, and only channel 3 is the channel having the earliest sending time for sending data unit 6. Similarly, when data unit 7 is sent, channel 1, channel 2 and channel 3 all are channels having the earliest sending time at this moment, and in this case, channel 1 may be selected to send data unit 7, channel 2 is selected to send data unit 8, and then only channel 3 is the channel having the earliest sending time for sending data unit 9. The similar operation is continued until the sending of data unit 18 is completed. The data unit sequence and other data units, the XGTC frame header and the XGTC frame tail on each channel form an XGTC subframe, and on each channel, a PSBu and an FEC check are added to the XGTC subframe on each channel in the manner in FIG. 3. FIG. 6 shows an example of processing the XGTC subframe of channel 3; the XGTC subframe of channel 1 and the XGTC subframe of channel 2 are processed similarly but are not shown in FIG. 6. In addition, in the embodiment, the OLT allocates a bandwidth to the ONU on each channel, and the bandwidth supports sending an XGTC frame header and an XGTC frame tail separately on each channel. In addition, the OLT also notifies the ONU of the size of the bandwidth occupied by each T-CONT, the bandwidth occupied by each T-CONT is used for sending the data of the T-CONT, and the data is encapsulated into a GEM frame sequence to form an XGTC payload. The data frame in FIG. 6 is composed of GEM frame sequences of multiple T-CONTs. It is to be noted that the case where the data frame is composed of a GEM frame sequence of one T-CONT is also applicable to the embodiment.

In an embodiment, 110 includes the following. In the case of the downstream direction, the to-be-transmitted data is encapsulated into a GEM frame sequence according to the bandwidth on each channel.

In the embodiment, in the case of the downstream direction, the sending device is the OLT, and the receiving device is the ONU. The OLT may send data to each ONU in a time-division multiplexing manner. The OLT may form a downstream bandwidth allocation entry after completing the scheduling of service data of each ONU, and send the downstream bandwidth allocation entry in a downstream frame together with the service data to the ONU. The OLT may also allocate the downstream bandwidth first to form a downstream bandwidth allocation entry, and then send service data to each ONU according to the bandwidth allocation. The downstream bandwidth allocation entry may be sent before the service data is sent so that the ONU can perform parsing to obtain downstream bandwidth allocation first and then receive the service data according to the bandwidth allocation. Since downstream traffic of the ONU is variable, for each downstream frame of each channel, the downstream bandwidth allocation entry needs to be updated. If the downstream traffic of the ONU is constant, the bandwidth required by the ONU is constant, in which case the downstream bandwidth allocation entry does not need to be sent in each downstream frame and may be sent only when the downstream bandwidth allocation entry needs to be updated.

In the embodiment, the OLT allocates the downstream bandwidth on each channel, determines the bandwidth allocated to each ONU, and then encapsulates the to-be-transmitted data into a data frame according to the size of the bandwidth on each channel for a specific ONU. The data frame includes one or more GEM frames which form a GEM frame sequence. On this basis, the GEM frame sequence is divided into several data units (a TU sequence), and the data units are sent on each channel according to the predetermined principle until the sending of each data unit is completed.

Figure 7:
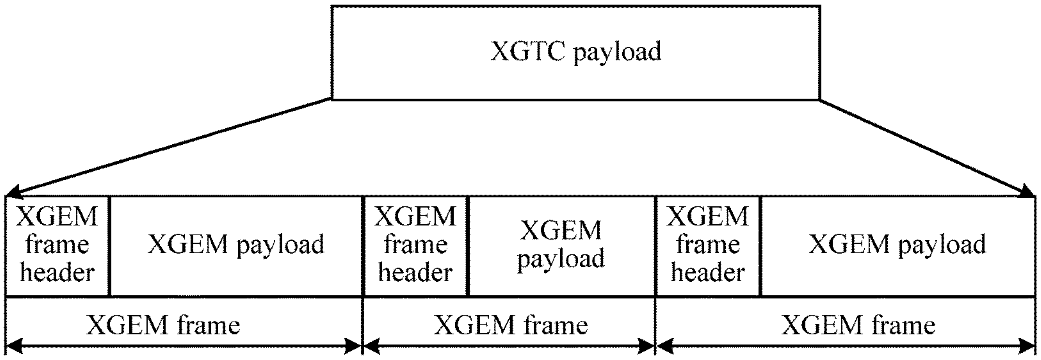
FIG. 7 is a schematic diagram of an XGEM frame sequence according to an embodiment.

FIG. 7 is a schematic diagram of an XGEM frame sequence according to an embodiment. In the embodiment, the to-be-transmitted data is encapsulated into a data frame, and the XG-PON Encapsulation Method (XGEM) is taken as an example. As shown in FIG. 7, an XGEM frame sequence includes XGEM frame headers and XGEM payloads, and the encapsulated data frame is a sequence composed of one or more XGEM frames.

Figure 8:
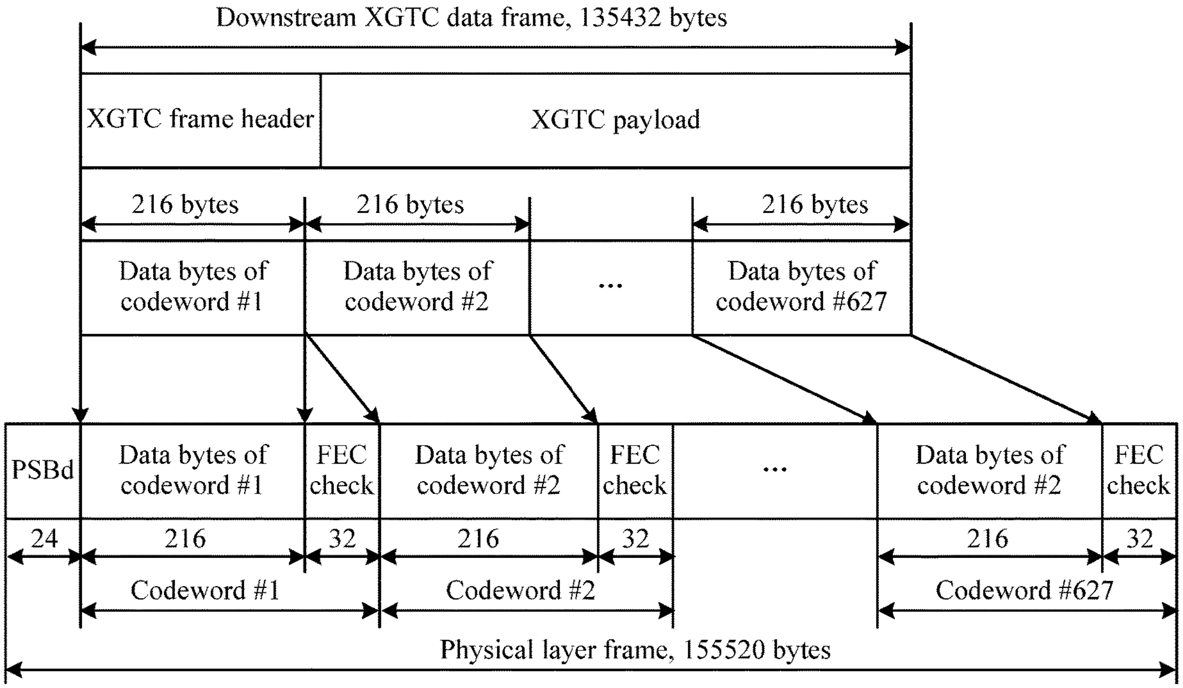
FIG. 8 is a diagram showing the conversion of an XGTC frame to a physical layer frame according to another embodiment.

FIG. 8 is a diagram showing the conversion of an XGTC frame to a physical layer frame according to another embodiment. As shown in FIG. 8, a downstream XGTC frame sent by the OLT includes a XGTC frame header and an XGTC payload, and the downstream XGTC frame is divided into multiple FEC data blocks. For example, starting from the XGTC frame header, every 216 bytes of data are divided into one group, and codewords corresponding to groups include #1, #2, . . . , and #627; an FEC check is added to each group of data separately to form an FEC codeword, where the FEC check may be the 32-byte parity; a physical synchronization block downstream (PSBd) is added to the frontmost of the XGTC frame so that a downstream physical layer frame can be formed.

Figure 9:
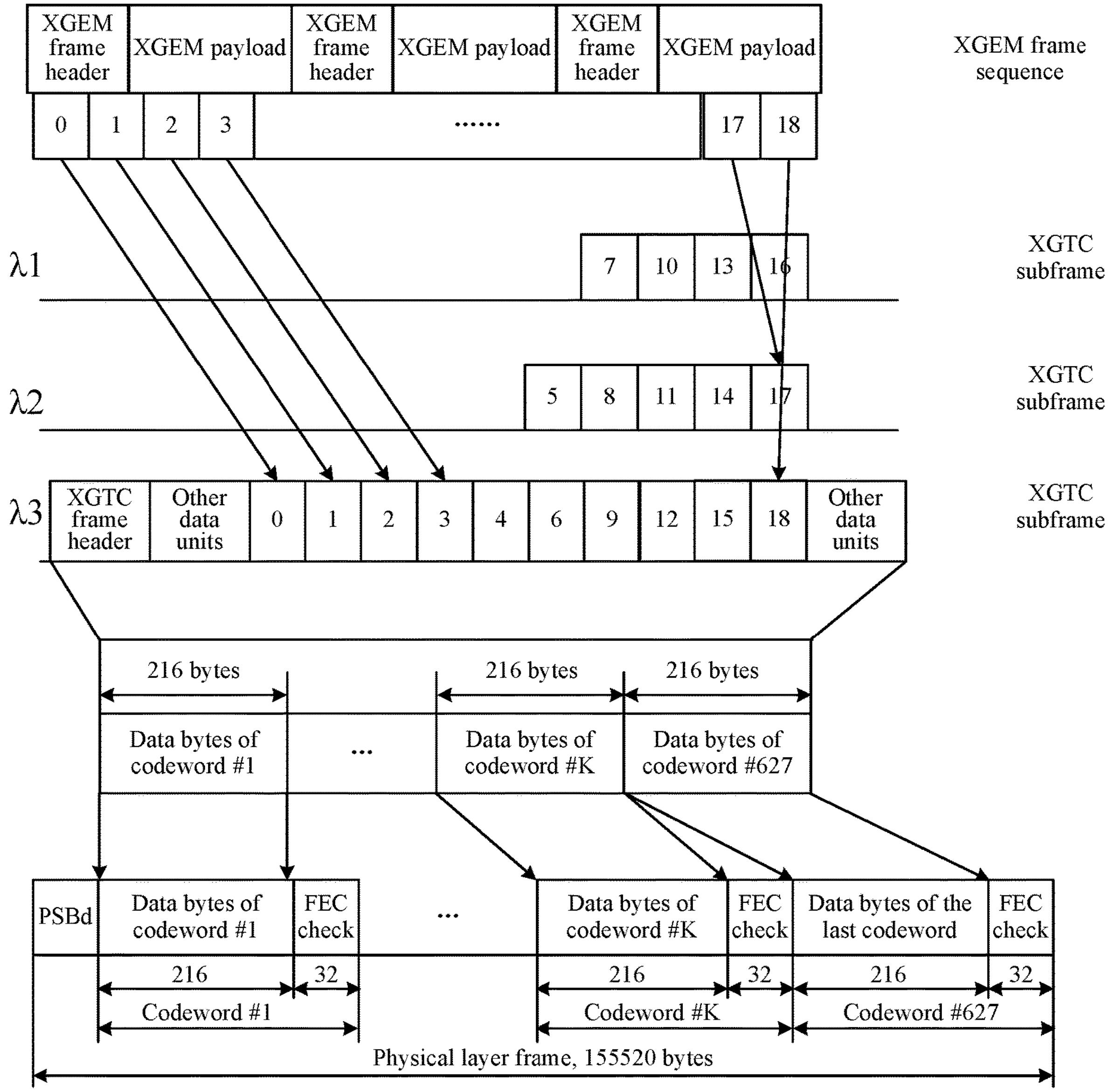
FIG. 9 is a diagram of sending a data frame in a downstream direction according to an embodiment.

FIG. 9 is a diagram of sending a data frame in a downstream direction according to an embodiment. As shown in FIG. 9, according to the bandwidth allocation, the to-be-sent data is encapsulated into an XGEM frame sequence as the data frame. The data frame is divided into 19 data units, and serial numbers are 0 to 18, respectively; 3 channels totally exist, and channel serial numbers are 1, 2 and 3, respectively, where channel 3 is the channel having the earliest sending time. Data units 0 to 4 are all sent through channel 3; when data unit 5 is sent, channel 2 and channel 3 both are channels having the earliest sending time at this moment, and in this case, the channel having the minimum channel serial number may be selected; that is, data unit 5 is sent through channel 2, and only channel 3 is the channel having the earliest sending time for sending data unit 6. Similarly, when data unit 7 is sent, channel 1, channel 2 and channel 3 all are channels having the earliest sending time at this moment, and in this case, channel 1 may be selected to send data unit 7, channel 2 is selected to send data unit 8, and then only channel 3 is the channel having the earliest sending time for sending data unit 9. The similar operation is continued until the sending of data unit 18 is completed. The data unit sequence and other data units and the XGTC frame header on each channel form an XGTC subframe, and on each channel, a PSBd and an FEC check are added to the XGTC subframe on each channel in the manner in FIG. 8. FIG. 9 shows an example of processing the XGTC subframe of channel 3; the XGTC subframe of channel 1 and the XGTC subframe of channel 2 are processed similarly but are not shown in FIG. 9.

In an embodiment, 102 is further included.

In 102, in the case of the downstream direction, downstream bandwidth allocation of each channel is determined according to pre-sending information or pre-filling information of a data unit in each channel.

In the embodiment, the sending device is the OLT, and the receiving device is the ONU. The OLT may perform pre-sending or pre-filling on each data unit on each channel to form a sequence of data units, and then form a bandwidth allocation result for the sequence of data units on each channel. If the downstream bandwidth allocation entry is not sent in each downstream frame, each time the downstream bandwidth allocation entry is calculated, the OLT needs to locally store the downstream bandwidth allocation entry, and in a case where the bandwidth allocation does not need to be updated, the OLT sends downstream data and management information according to the locally stored downstream bandwidth allocation entry.

In an embodiment, 103 is further included.

In 103, in the case of the downstream direction, a downstream bandwidth is allocated to the receiving device.

In the embodiment, the sending device is the OLT, and the receiving device is the ONU. The downstream bandwidth is allocated to each ONU, according to a request of the ONU or traffic statistics for the ONU by the OLT, for transmitting downstream data. For example, the OLT may allocate the downstream bandwidth to each ONU through a bandwidth map; the ONU parses the bandwidth map to obtain a bandwidth entry belonging to the ONU itself, and receives downstream data and management information sent by the OLT within the bandwidth specified by the corresponding bandwidth entry.

In an embodiment, 104 is further included.

In 104, in the case of the downstream direction, the downstream bandwidth allocation is sent to the receiving device.

In the embodiment, the sending device is the OLT, and the receiving device is the ONU. The OLT sends the downstream bandwidth allocation to each ONU. The downstream bandwidth allocation may be determined according to a pre-sending result or a pre-filling result, or may be determined according to traffic statistics for the ONU by the OLT.

In an embodiment, 105 is further included.

In 105, a common bandwidth allocation reference point on each channel is determined.

In the embodiment, the common bandwidth allocation reference point on each channel may be determined according to a physical synchronization block downstream (PSBd) in the data frame.

In an embodiment, 105 includes the following. A physical synchronization block downstream is synchronously sent on each channel, and the physical synchronization block downstream is used as a common downstream bandwidth allocation reference point on the each channel.

In the embodiment, in the downstream direction, the OLT synchronously sends the physical synchronization block downstream (the PSBd in FIG. 8) on each channel so that the each channel has the common downstream bandwidth allocation reference point. Therefore, the receiving device can determine a start position of a physical layer subframe in each channel of the channels, and determine a relative position relationship of start positions of the channels according to the bandwidth allocation of each channel.

In an embodiment, 105 includes the following. A time delay is added based on that a physical synchronization block downstream is received as a common upstream bandwidth allocation reference point on the each channel.

In the embodiment, in the upstream direction, the ONU receives the PSBd on each channel, and, after a corresponding time delay including a response time, an equalization delay time, etc., obtains the start position of the upstream physical layer frame as the common upstream bandwidth allocation reference point of the each channel.

It is to be noted that the preceding manner for determining the bandwidth allocation reference point is a preferable manner, and in some embodiments, the bandwidth allocation reference point may also be determined in other manners. For example, the bandwidth allocation reference point may also be determined according to that in the downstream direction, PSBds are not synchronously sent, but have a certain interval between each other.

In an embodiment, 106 is further included.

In 106, downstream bandwidth allocation or upstream bandwidth allocation is transmitted in each downstream frame; or downstream bandwidth allocation or upstream bandwidth allocation is transmitted in a case where bandwidth allocation is updated.

In the embodiment, the bandwidth allocation may be transmitted, through a downstream frame, between the OLT and each ONU. The bandwidth allocation may or may not be transmitted in each downstream frame. If the downstream frame does not contain the bandwidth allocation, the ONU may transmit data and management information according to a locally stored bandwidth corresponding to the ONU in a case where no bandwidth map is received.

In an embodiment, a slot on each channel available to data sending may be formed through bandwidth allocation or may be formed during data sending. The slot may be pre-sent to the receiving device or be sent together with the to-be-transmitted data to the receiving device. In addition, in a case where the slot remains unchanged for a certain time, the slot may be stored locally for the receiving device and only sent to the receiving device in a case where the slot needs to be updated.

According to the data sending method of the embodiment, the generation of the data frame may be performed in the manner of a single channel, that is, only one frame header is encapsulated for the data, so that the frame header overload is reduced. In addition, the sending device and the receiving device share relevant information of bandwidth allocation and a target slot on each channel, so that a channel and a slot which correspond to data sending and receiving are clarified, and a start position and an end position of data sending and receiving on each channel can be effectively determined. The data frame is divided into multiple data units and the multiple data units are sent one by one according to the predetermined principle, so that on this basis, the data units can be received one by one according to the same principle without specific processing or additional processing of adding a data frame header, the frame header overhead on each channel is simply and effectively reduced, and the data transmission efficiency is improved.

An embodiment of the present application further provides a data receiving method, and the method is applicable to a receiving device in a PON. The receiving device may be an OLT or an ONU. It is to be noted that the data receiving method in the embodiment and the data sending method in the preceding embodiments belong to the same concept and the operation performed by the receiving device corresponds to the operation performed by the sending device in the preceding embodiments. For technical details not described in detail in the embodiment, reference may be made to any one of the preceding embodiments.

Figure 10:
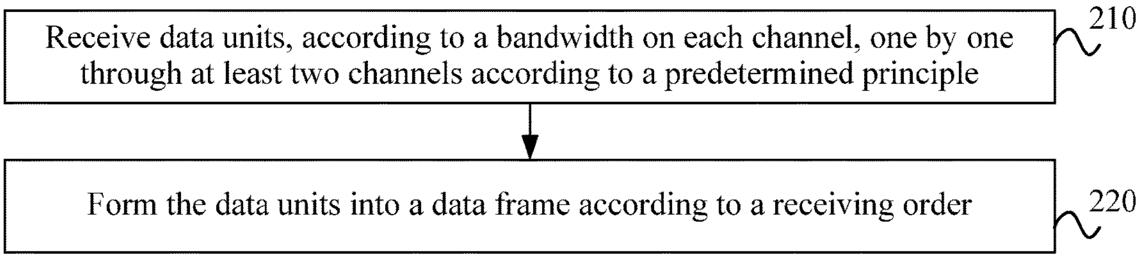
FIG. 10 is a flowchart of a data receiving method according to an embodiment.

FIG. 10 is a flowchart of a data receiving method according to an embodiment. As shown in FIG. 10, the method provided in the embodiment includes 210 and 220 described below.

In 210, data units are received, according to a bandwidth on each channel, one by one through at least two channels according to a predetermined principle.

In 220, the data units are formed into a data frame according to a receiving order.

In the embodiment, in a case of the binding of multiple channels, the receiving device determines a slot for transmitting data units on each channel, receives data units one by one in the corresponding slot of each channel according to the predetermined principle, and then forms the data units into the data frame according to the receiving order to complete the reception of the data units. On this basis, 220 may further include the following. The data frame formed by the data units are parsed so that transmitted data is obtained.

The principle of the data receiving method of the embodiment may be understood as the reverse process of the data frame sending process shown in FIG. 4, FIG. 5, FIG. 6 or FIG. 9. For example, in a downstream direction, the ONU parses a PSBd on each channel and then obtains a reference point, performs an FEC check and an error correction, and obtains an XGTC subframe; if downstream bandwidth allocation information exists, the ONU obtains downstream bandwidth allocation belonging to the ONU itself through parsing, or the ONU locally acquires downstream bandwidth allocation; according to the downstream bandwidth allocation, the ONU receives data units one by one from each channel according to the predetermined principle, and forms a data unit sequence according to a sequential order. After the reception of the data units is completed, the data unit sequence is the data frame, and the data frame is a GEM frame sequence. The GEM frame sequence is parsed according to the format of the GEM frame to obtain data. For another example, in an upstream direction, the OLT parses a PSBu on each channel according to locally stored upstream bandwidth allocation sent to the ONU, performs an FEC check and an error correction, and then obtains an XGTC subframe; according to the upstream bandwidth allocation, the OLT receives data units one by one from each channel according to the predetermined principle and forms a data unit sequence according to a sequential order. After the reception of the data units is completed, the data unit sequence is the data frame, and the data frame is an XGTC frame, or a DBRu and a GEM frame sequence, or a GEM frame sequence. The data frame is parsed according to the format of the XGTC frame, or the format of the DBRu and the GEM frame sequence, or the format of the GEM frame sequence to obtain data. In this case, the data frame needs to be parsed on each channel only according to the bandwidth allocation and the predetermined principle, and no extra frame header processing needs to be performed, so that the frame header overhead is reduced and the data transmission efficiency is improved.

In the embodiment, the predetermined principle is used for describing through which channel each data unit should be sequentially received, and the predetermined principle may be determined according to the bandwidth and slot available to each channel, the serial number of each channel, the priority of each channel, the data transmission quality of each channel, etc. For example, in multiple channels, an earliest received data unit is acquired each time; if multiple such data units exist, the data unit on one of the multiple channels is received according to a certain rule (for example, a minimum channel serial number or a maximum channel serial number) until data units in XGTC subframes of the multiple channels are received. All data units are assembled into a complete data frame according to the receiving order, such as an XGTC frame, or a DBRu and a GEM frame sequence, or a GEM frame sequence, and then the data frame is parsed.

According to the data sending method of the embodiment, the receiving device receives data units one by one according to the certain rule, forms the data frame and then parses the data frame. In this process, the data frame needs to be parsed on each channel only according to the bandwidth allocation and the predetermined principle, and no extra frame header processing needs to be performed, so that the frame header overhead is reduced and the data transmission efficiency is improved.

In an embodiment, 210 includes the following.

During each time of receiving a data unit, a data unit on a channel having the earliest sending time is received.

In a case where at least two channels having the earliest sending time exist, one channel is determined from the at least two channels having the earliest sending time according to a minimum channel serial number or a maximum channel serial number, and a data unit is received through the one channel.

In an embodiment, before 220, 201 is further included.

In 201, in a case of an upstream direction, for each channel, a relative position relationship of start positions of the at least two channels is determined according to upstream bandwidth allocation of the each channel.

In the embodiment, the sending device is the ONU, and the receiving device is the OLT. The OLT parses a PSBu for each channel to determine a start position of each physical layer subframe in each channel, determines the relative position relationship of start positions of the channels according to the upstream bandwidth allocation of each channel, in addition, determines the XGTC subframe by decoding the FEC in each channel, receives data units one by one from each channel according to the predetermined principle to form the data frame, and perform corresponding format parsing on the data frame to obtain data.

In an embodiment, before 210, 202 is further included.

In 202, in a case of a downstream direction, for each channel, a start position of each physical layer subframe is determined by parsing a corresponding PSBd.

In 203, a relative position relationship of start positions of the at least two channels is determined according to downstream bandwidth allocation of the each channel.

In the embodiment, the sending device is the OLT, and the receiving device is the ONU. The ONU parses a PSBd for each channel to determine the start position of each physical layer subframe in each channel; the ONU can determine the bandwidth allocation corresponding to the ONU itself according to the downstream bandwidth allocation and acquires bandwidths corresponding to all channels; the OLT determines the relative position relationship of the start positions of the channels according to the upstream bandwidth allocation of each channel; in addition, the OLT decodes the FEC in each channel, receives data units one by one within the bandwidths corresponding to all channels according to the predetermined principle to form the data frame, and parses the data frame according to a corresponding format to obtain data.

In an embodiment, in the case of the upstream direction, the data frame formed by the data units is an XGTC frame, or a DBRu and a GEM frame sequence, or a GEM frame sequence. In the case of the downstream direction, the data frame formed by the data units is a GEM frame sequence.

In the embodiment, in the case of the upstream direction, the receiving device is the OLT, and the data frame formed by the data units is an XGTC frame, or a DBRu and a GEM frame sequence, or a GEM frame sequence. In the case of the downstream direction, the receiving device is the ONU, and the data frame formed by the data units is a GEM frame sequence.

According to the data receiving method of the embodiment, the receiving device only needs to receive data units in each channel according to the bandwidth allocation and the predetermined principle and form the data frame, so that the frame header overhead is reduced. In addition, the sending device and the receiving device share relevant information of bandwidth allocation and a target slot on each channel, so that a channel and a slot which correspond to data sending and receiving are clarified, and a start position and an end position of data sending and receiving on each channel can be effectively determined. The data frame is divided into multiple data units and the multiple data units are sent one by one according to the predetermined principle, so that on this basis, the data units can be received one by one according to the same principle without specific processing or additional processing of adding a data frame header, the frame header overhead on each channel is simply and effectively reduced, and the data transmission efficiency is improved.

Figure 11:
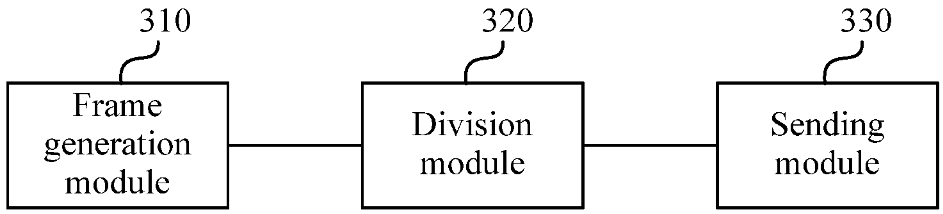
FIG. 11 is a structural diagram of a data sending apparatus according to an embodiment.

An embodiment of the present application further provides a data sending apparatus. FIG. 11 is a structural diagram of a data sending apparatus according to an embodiment. As shown in FIG. 11, the data sending apparatus includes a frame generation module 310, a division module 320 and a sending module 330.

The frame generation module 310 is configured to generate to-be-transmitted data into a data frame according to a bandwidth on each channel.

The division module 320 is configured to divide the data frame into at least two data units.

The sending module 330 is configured to send the at least two data units one by one through at least two channels according to a predetermined principle.

According to the data sending apparatus of the embodiment, the to-be-transmitted data is generated into the data frame, the data frame is divided into multiple data units, and the multiple data units are sent one by one through different channels according a certain rule. In this process, the transmission condition of the data on each channel can be clarified only according to the bandwidth of each channel and the predetermined principle, so that the frame header overhead is reduced and the data transmission efficiency is improved.

In an embodiment, the sending module 330 is configured to perform operations described below.

Each data unit of the at least two data units is sent through a channel having the earliest sending time of the at least two channels.

In a case where at least two channels having the earliest sending time exist, one channel is selected from the at least two channels having the earliest sending time according to a minimum channel serial number or a maximum channel serial number, and the each data unit is sent through the one channel.

In an embodiment, the data sending apparatus further includes a bandwidth determination module.

The bandwidth determination module is configured to, in a case of an upstream direction, determine upstream bandwidth allocation of the each channel according to bandwidth allocation information carried in a downstream frame.

In an embodiment, the data frame includes a TC data frame, or a DBRu and a GEM frame sequence, or a GEM frame sequence.

In an embodiment, the data sending apparatus further includes a pre-allocation module.

The pre-allocation module is configured to, in a case of a downstream direction, determine downstream bandwidth allocation of the each channel according to pre-sending information or pre-filling information of a data unit of the at least two data units in the each channel.

In an embodiment, the data sending apparatus further includes an allocation module.

The allocation module is configured to, in the case of the downstream direction, allocate a downstream bandwidth on the each channel to a receiving device.

In an embodiment, the data sending apparatus further includes a bandwidth allocation sending module.

The bandwidth allocation sending module is configured to, in the case of the downstream direction, send the downstream bandwidth allocation to the receiving device.

In an embodiment, the data sending apparatus further includes an indication module.

The indication module is configured to indicate the size of a bandwidth of a transmission container through the bandwidth allocation information in the downstream frame.

In an embodiment, the data sending apparatus further includes a reference point determination module.

The reference point determination module is configured to determine a common bandwidth allocation reference point on the each channel.

In an embodiment, the reference point determination module is configured to synchronously send a physical synchronization block downstream on the each channel, and use the physical synchronization block downstream as a common downstream bandwidth allocation reference point on the each channel.

In an embodiment, the reference point determination module is configured to add a time delay based on receiving a physical synchronization block downstream as a common upstream bandwidth allocation reference point on the each channel.

In an embodiment, the bandwidth allocation sending module is configured to transmit downstream bandwidth allocation or upstream bandwidth allocation in each of the downstream frame; or transmit downstream bandwidth allocation or upstream bandwidth allocation in a case where bandwidth allocation is updated.

The data sending apparatus provided in the embodiment and the data sending method provided in the preceding embodiments belong to the same inventive concept. For technical details not described in detail in the embodiment, reference may be made to any one of the preceding embodiments. The embodiment has the same beneficial effects as the performed data sending method.

Figure 12:
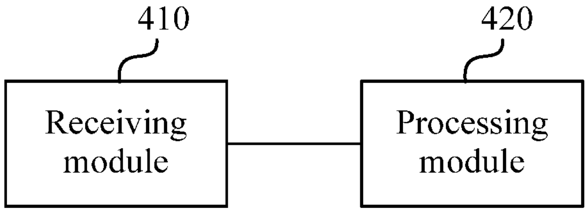
FIG. 12 is a structural diagram of a data receiving apparatus according to an embodiment.

An embodiment of the present application further provides a data sending apparatus. FIG. 12 is a structural diagram of a data receiving apparatus according to an embodiment. As shown in FIG. 12, the data receiving apparatus includes a receiving module 410 and a processing module 420.

The receiving module 410 is configured to receive, according to a bandwidth on each channel, data units one by one through at least two channels according to a predetermined principle.

The processing module 420 is configured to form the data units into a data frame according to a receiving order.

According to the data receiving apparatus of the embodiment, the data units are received one by one according to a certain rule, and then the data units are formed into the data frame for parsing. In this process, the transmission condition of the data on each channel can be clarified only according to the bandwidth of each channel and the predetermined principle, so that the frame header overhead is reduced and the data transmission efficiency is improved.

In an embodiment, the receiving module 410 is specifically configured to perform operations described below.

During each time of receiving a data unit, a data unit on a channel having the earliest sending time of the at least two channels is received.

In a case where at least two channels having the earliest sending time exist, one channel is determined from the at least two channels having the earliest sending time according to a minimum channel serial number or a maximum channel serial number, and a data unit is received through the one channel.

In an embodiment, the data receiving apparatus further includes a first position determination module.

The first position determination module is configured to, before the data units are formed into the data frame according to the receiving order, in a case of an upstream direction, for each channel of the at least two channels, determine a relative position relationship of start positions of the at least two channels according to upstream bandwidth allocation of the each channel.

In an embodiment, the data receiving apparatus further includes a second position determination module.

The second position determination module is configured to, in a case of a downstream direction, for each channel of the at least two channels, determine a start position of each physical layer subframe by parsing a corresponding PSBd, and determine a relative position relationship of start positions of the at least two channels according to downstream bandwidth allocation of the each channel.

In an embodiment, in the case of the upstream direction, the data frame formed by the data units is a TC data frame, or a DBRu and a GEM frame sequence, or a GEM frame sequence; in the case of the downstream direction, the data frame formed by the data units is a GEM frame sequence.

The data receiving apparatus provided in the embodiment and the data receiving method provided in the preceding embodiments belong to the same inventive concept. For technical details not described in detail in the embodiment, reference may be made to any one of the preceding embodiments. The embodiment has the same beneficial effects as the performed data sending method.

An embodiment of the present application further provides a sending device. The data sending method may be performed by the data sending apparatus which may be implemented by software and/or hardware and integrated in the sending device. The sending device may be an OLT or an ONU in a PON.

Figure 13:
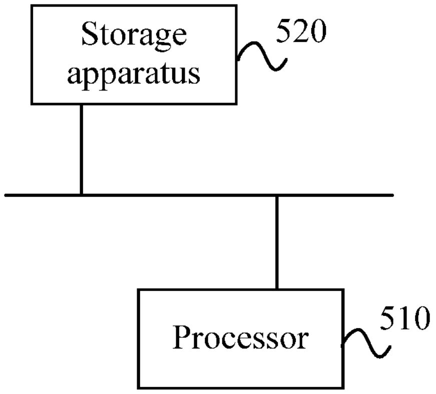
FIG. 13 is a diagram of the hardware structure of a sending device according to an embodiment.

FIG. 13 is a diagram of the hardware structure of a sending device according to an embodiment. As shown in FIG. 13, the sending device provided in the embodiment includes a processor 510 and a storage apparatus 520. The sending device may include one or more processors. One processor 510 is shown as an example in FIG. 13. The processor 510 and the storage apparatus 420 in the sending device may be connected via a bus or in other manners. The connection via a bus is shown as an example in FIG. 13.

One or more programs are performed by one or more processors 510 to cause the one or more processors to implement the data sending method in any one of the preceding embodiments.

The storage apparatus 520 in the sending device, as a non-transitory computer-readable storage medium, may be configured to store one or more programs which may be software programs, computer-executable programs and modules, such as program instructions/modules (for example, modules in the data sending apparatus, including a frame generation module 310, a division module 320 and a sending module 330, as shown in FIG. 11) corresponding to the data sending method in the embodiments of the present application. The processor 510 executes software programs, instructions and modules stored in the storage apparatus 520 to perform various function applications and data processing of the sending device, that is, to implement the data sending method in the preceding method embodiments.

The storage apparatus 520 mainly includes a program storage region and a data storage region. The program storage region may store an operating system and an application program required by at least one function. The data storage region may store data (such as to-be-transmitted data and a data frame in the preceding embodiments) created based on the use of the device. In addition, the storage apparatus 520 may include a high-speed random-access memory and may further include a nonvolatile memory, such as at least one disk memory, a flash memory or another nonvolatile solid-state memory. In some examples, the storage apparatus 520 may include memories which are remotely disposed relative to the processor 510, and these remote memories may be connected to the device via a network. Examples of the preceding network include, but are not limited to, the Internet, an intranet, a local area network, a mobile communication network and a combination thereof.

Moreover, when the one or more programs included in the preceding sending device are performed by the one or more processors 510, operations described below are achieved. To-be-transmitted data is generated into a data frame according to a bandwidth on each channel; the data frame is divided into at least two data units; and the at least two data units are sent one by one through at least two channels according to a predetermined principle.

The sending device provided in the embodiment and the data sending method provided in the preceding embodiments belong to the same inventive concept. For technical details not described in detail in the embodiment, reference may be made to any one of the preceding embodiments. The embodiment has the same beneficial effects as the performed data sending method.

An embodiment of the present application further provides a receiving device. The data receiving method may be performed by the data receiving apparatus which may be implemented by software and/or hardware and integrated in the receiving device. The sending device may be an OLT or an ONU in a PON.

Figure 14:
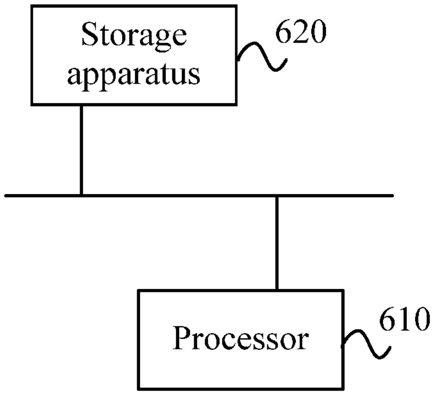
FIG. 14 is a diagram of the hardware structure of a receiving device according to an embodiment.

FIG. 14 is a diagram of the hardware structure of a receiving device according to an embodiment. As shown in FIG. 14, the receiving device provided in the embodiment includes a processor 610 and a storage apparatus 620. The receiving device may include one or more processors. One processor 610 is shown as an example in FIG. 14. The processor 610 and the storage apparatus 620 in the receiving device may be connected via a bus or in other manners. The connection via a bus is shown as an example in FIG. 14.

One or more programs are performed by one or more processors 610 to cause the one or more processors to implement the data receiving method in any one of the preceding embodiments.

The storage apparatus 620 in the receiving device, as a non-transitory computer-readable storage medium, may be configured to store one or more programs which may be software programs, computer-executable programs and modules, such as program instructions/modules (for example, modules in the data receiving apparatus, including a receiving module 410 and a processing module 420, as shown in FIG. 12) corresponding to the data receiving method in the embodiments of the present application. The processor 610 executes software programs, instructions and modules stored in the storage apparatus 620 to perform various function applications and data processing of the receiving device, that is, to implement the data receiving method in the preceding method embodiments.

The storage apparatus 620 mainly includes a program storage region and a data storage region. The program storage region may store an operating system and an application program required by at least one function. The data storage region may store data (such as to-be-transmitted data and a data frame in the preceding embodiments) created based on the use of the device. In addition, the storage apparatus 620 may include a high-speed random-access memory and may further include a nonvolatile memory, such as at least one disk memory, a flash memory or another nonvolatile solid-state memory. In some examples, the storage apparatus 620 may include memories which are disposed remotely relative to the processor 610, and these remote memories may be connected to the device via a network. Examples of the preceding network include, but are not limited to, the Internet, an intranet, a local area network, a mobile communication network and a combination thereof.

Moreover, when the one or more programs included in the preceding receiving device are performed by the one or more processors 610, operations described below are achieved. Data units are received, according to a bandwidth on each channel, one by one through at least two channels according to a predetermined principle; and the data units are formed into a data frame according to a receiving order.

The receiving device provided in the embodiment and the data receiving method provided in the preceding embodiments belong to the same inventive concept. For technical details not described in detail in the embodiment, reference may be made to any one of the preceding embodiments. The embodiment has the same beneficial effects as the performed data receiving method.

An embodiment of the present application further provides a storage medium including computer-executable instructions which, when executed by a computer processor, perform a data sending method or a data receiving method.

The data sending method includes the following. To-be-transmitted data is generated into a data frame according to a bandwidth on each channel; the data frame is divided into at least two data units; and the at least two data units are sent one by one through at least two channels according to a predetermined principle.

The data receiving method includes the following. Data units are received, according to a bandwidth on each channel, one by one through at least two channels according to a predetermined principle; and the data units are formed into a data frame according to a receiving order.

From the preceding description of the embodiments, it is apparent to those skilled in the art that the present application may be implemented by use of software and general-purpose hardware or may be implemented by hardware. Based on this understanding, the technical solutions of the present application may be embodied in the form of a software product. The computer software product may be stored in a computer-readable storage medium, such as a floppy disk, a read-only memory (ROM), a random-access memory (RAM), a flash memory, a hard disk or an optical disc of a computer and includes multiple instructions for causing a computer device (which may be a personal computer, a server or a network device) to perform the method in any embodiment of the present application.

The embodiments provide a data sending method and apparatus, a data receiving method and apparatus, a sending device, a receiving device and a medium. In the data sending method, to-be-transmitted data is generated into a data frame according to a bandwidth on each channel; the data frame is divided into at least two data units; and the at least two data units are sent one by one through at least two channels according to a predetermined principle. The data units are sent one by one according to the bandwidth of each channel and the predetermined principle, so that the transmission condition of the data on each channel can be clarified without additional frame header processing on each channel, and thus the frame header overhead is reduced and the data transmission efficiency is improved.

The preceding shows only example embodiments of the present application and is not intended to limit the scope of the present application.

A block diagram of any logic flow among the drawings of the present application may represent program steps, may represent interconnected logic circuits, modules and functions, or may represent a combination of program steps with logic circuits, modules and functions. Computer programs may be stored in the memory. The memory may be of any type suitable for a local technical environment and may be implemented by using any suitable data storage technology, such as, but not limited to, a read-only memory (ROM), a random-access memory (RAM), and an optical memory apparatus and system (a digital video disc (DVD) or a compact disc (CD)). Computer-readable media may include non-transitory storage media. A data processor may be of any type suitable for a local technical environment, such as, but not limited to, a general-purpose computer, a special-purpose computer, a microprocessor, a digital signal processor (DSP), an application-specific integrated circuit (ASIC), a field-programmable gate array (FGPA) and a processor based on a multi-core processor architecture.

The detailed description of example embodiments of the present application has been provided above through exemplary and non-restrictive examples. However, considering the drawings and the claims, various modifications and adjustments to the preceding embodiments are apparent to those skilled in the art without deviating from the scope of the present application. Accordingly, the proper scope of the present application is determined according to the claims.

What is claimed is:

1. A data sending method, performed by a sending device in a passive optical network (PON), comprising:

generating to-be-transmitted data into a data frame according to a bandwidth on each channel;

dividing the data frame into at least two data units; and sending the at least two data units one by one through at least two channels according to a bandwidth on each of the at least two channels and a predetermined principle, wherein the predetermined principle is used to indicate a channel of the at least two channels through which each of the at least two data units is sent in sequence;

wherein sending the at least two data units one by one through the at least two channels according to the predetermined principle comprises:

sending each data unit of the at least two data units through a channel having an earliest sending time of the at least two channels; and in a case where at least two channels having the earliest sending time exist, selecting one channel from the at least two channels having the earliest sending time according to a minimum channel serial number or a maximum channel serial number, and sending the each data unit through the one channel;

wherein the PON comprises an optical line terminal (OLT) and at least one optical network unit (ONU); and wherein in a case of an upstream direction, the at least one ONU is the sending device, and the OLT is a receiving device;

the data frame comprises: an X gigabits transmission convergence (XGTC) data frame, or a dynamic bandwidth report upstream (DBRu) and a gigabit encapsulation method (GEM) frame sequence, or an X gigabits encapsulation method (XGEM) frame sequence;

in response to the data frame being the XGTC data frame, the bandwidth is allocated by the OLT to the at least one ONU on each of the at least two channels, and only one XGTC frame header and one XGTC frame tail are sent within the bandwidth;

in response to the data frame being the DBRu and the GEM frame sequence, an XGTC frame header and an XGTC frame tail are sent on each of the at least two channels, wherein the XGTC frame header is sent before a data unit is sent, and the XGTC frame tail is sent after the sending of the data unit is completed; and in response to the data frame being the XGEM frame sequence, the bandwidth is allocated by the OLT to the at least one ONU on each of the at least two channels, and only one XGTC frame header and one XGTC frame tail are sent within the bandwidth.

2. The data sending method according to claim 1, further comprising:

in the case of the upstream direction, determining upstream bandwidth allocation of the each channel according to bandwidth allocation information carried in a downstream frame.

3. The data sending method according to claim 2, further comprising:

indicating a size of a bandwidth of a transmission container through the bandwidth allocation information in the downstream frame.

4. The data sending method according to claim 1, further comprising:

in a case of a downstream direction, determining downstream bandwidth allocation of the each channel according to pre-sending information or pre-filling information of a data unit of the at least two data units in the each channel.

5. The data sending method according to claim 4, further comprising:

in the case of the downstream direction, sending the downstream bandwidth allocation to the receiving device.

6. The data sending method according to claim 1, further comprising:

in the case of the downstream direction, allocating a downstream bandwidth on the each channel to the receiving device.

7. The data sending method according to claim 1, further comprising:

determining a common bandwidth allocation reference point on the each channel.

8. The data sending method according to claim 7, wherein determining the common bandwidth allocation reference point on the each channel comprises:

synchronously sending a physical synchronization block downstream on the each channel, and using the physical synchronization block downstream as a common downstream bandwidth allocation reference point on the each channel.

9. The data sending method according to claim 7, wherein determining the common bandwidth allocation reference point on the each channel comprises:

adding a time delay based on receiving a physical synchronization block downstream as a common upstream bandwidth allocation reference point on the each channel.

10. The data sending method according to claim 1, further comprising:

transmitting downstream bandwidth allocation or upstream bandwidth allocation in each of the downstream frame; or transmitting downstream bandwidth allocation or upstream bandwidth allocation in a case where bandwidth allocation is updated.

11. A non-transitory computer-readable storage medium for storing a computer program which, when executed by a processor, implements the data sending method according to claim 1.

12. A data receiving method, performed by a receiving device in a passive optical network (PON), comprising:

receiving data units one by one through at least two channels according to a bandwidth on each of the at least two channels and a predetermined principle, wherein the data units are divided from a first data frame, wherein the predetermined principle is used to indicate a channel of the at least two channels through which each of the data units is received in sequence; and forming the data units into a second data frame according to a receiving order;

wherein receiving the data units one by one through the at least two channels according to the predetermined principle comprises:

during each time of receiving a data unit, receiving a data unit on a channel having an earliest sending time of the at least two channels; and in a case where at least two channels having the earliest sending time exist, determining one channel from the at least two channels having the earliest sending time according to a minimum channel serial number or a maximum channel serial number, and receiving a data unit through the one channel;

wherein the PON comprises an optical line terminal (OLT) and at least one optical network unit (ONU); and wherein in a case of an upstream direction, the at least one ONU is the sending device, and the OLT is the receiving device;

the first data frame comprises: an X gigabits transmission convergence (XGTC) data frame, or a dynamic bandwidth report upstream (DBRu) and a gigabit encapsulation method (GEM) frame sequence, or an X gigabits encapsulation method (XGEM) frame sequence;

in response to the first data frame being the XGTC data frame, the bandwidth is allocated by the OLT to the at least one ONU on each of the at least two channels, and only one XGTC frame header and one XGTC frame tail are sent within the bandwidth;

in response to the first data frame being the DBRu and the GEM frame sequence, an XGTC frame header and an XGTC frame tail are sent on each of the at least two channels, wherein the XGTC frame header is sent before a data unit is sent, and the XGTC frame tail is sent after the sending of the data unit is completed; and in response to the first data frame being the XGEM frame sequence, the bandwidth is allocated by the OLT to the at least one ONU on each of the at least two channels, and only one XGTC frame header and one XGTC frame tail are sent within the bandwidth.

13. The data receiving method according to claim 12, before forming the data units into the second data frame according to the receiving order, further comprising:

in the case of the upstream direction, for each channel of the at least two channels, determining a relative position relationship of a start position of the each channel according to upstream bandwidth allocation of the each channel.

14. The data receiving method according to claim 12, before forming the data units into the data frame according to the receiving order, further comprising:

in a case of a downstream direction, for each channel of the at least two channels, determining a start position of each physical layer subframe by parsing a corresponding physical synchronization block downstream, and determining a relative position relationship of a start position of the each channel according to downstream bandwidth allocation of the each channel.

15. The data receiving method according to claim 12, wherein in a case of a downstream direction, the data frame formed by the data units is a GEM frame sequence.

16. A receiving device, comprising:

at least one processor; and a storage apparatus configured to store at least one program;

wherein the at least one program, when executed by the at least one processor, cause the at least one processor to implement the data receiving method according to claim 13.

17. A sending device, comprising:

at least one processor; and a storage apparatus configured to store one or more programs;

wherein the at least one program, when executed by the at least one processor, cause the at least one processor to execute operations, wherein the operations comprises:

generating to-be-transmitted data into a data frame according to a bandwidth on each channel;

dividing the data frame into at least two data units; and sending the at least two data units one by one through at least two channels according to a bandwidth on each of the at least two channels and a predetermined principle, wherein the predetermined principle is used to indicate a channel of the at least two channels through which each of the at least two data units is sent in sequence;

wherein sending the at least two data units one by one through the at least two channels according to the predetermined principle comprises:

sending each data unit of the at least two data units through a channel having an earliest sending time of the at least two channels; and in a case where at least two channels having the earliest sending time exist, selecting one channel from the at least two channels having the earliest sending time according to a minimum channel serial number or a maximum channel serial number, and sending the each data unit through the one channel;

wherein the sending device is in a passive optical network (PON), the PON comprises an optical line terminal (OLT) and at least one optical network unit (ONU); and wherein in a case of an upstream direction, the at least one ONU is the sending device, and the OLT is a receiving device;

the data frame comprises: an X gigabits transmission convergence (XGTC) data frame, or a dynamic bandwidth report upstream (DBRu) and a gigabit encapsulation method (GEM) frame sequence, or an X gigabits encapsulation method (XGEM) frame sequence;

in response to the data frame being the XGTC data frame, the bandwidth is allocated by the OLT to the at least one ONU on each of the at least two channels, and only one XGTC frame header and one XGTC frame tail are sent within the bandwidth;

in response to the data frame being the DBRu and the GEM frame sequence, an XGTC frame header and an XGTC frame tail are sent on each of the at least two channels, wherein the XGTC frame header is sent before a data unit is sent, and the XGTC frame tail is sent after the sending of the data unit is completed; and in response to the data frame being the XGEM frame sequence, the bandwidth is allocated by the OLT to the at least one ONU on each of the at least two channels, and only one XGTC frame header and one XGTC frame tail are sent within the bandwidth.

18. The sending device according to claim 17, wherein the at least one program, when executed by the at least one processor, cause the at least one processor to execute operations, wherein the operations further comprises:

in the case of the upstream direction, determining upstream bandwidth allocation of the each channel according to bandwidth allocation information carried in a downstream frame.

19. The sending device according to claim 17, wherein the at least one program, when executed by the at least one processor, cause the at least one processor to execute operations, wherein the operations further comprises:

in a case of a downstream direction, determining downstream bandwidth allocation of the each channel according to pre-sending information or pre-filling information of a data unit of the at least two data units in the each channel.

20. The sending device according to claim 17, wherein the at least one program, when executed by the at least one processor, cause the at least one processor to execute operations, wherein the operations further comprises:

in the case of the downstream direction, allocating a downstream bandwidth on the each channel to the receiving device.

* * * * *